Nov. 29, 1955  C. F. HAMMOND  2,724,977
MANUAL AND POWER ACTUATED STEERING MECHANISM
Filed July 2, 1954  3 Sheets-Sheet 1
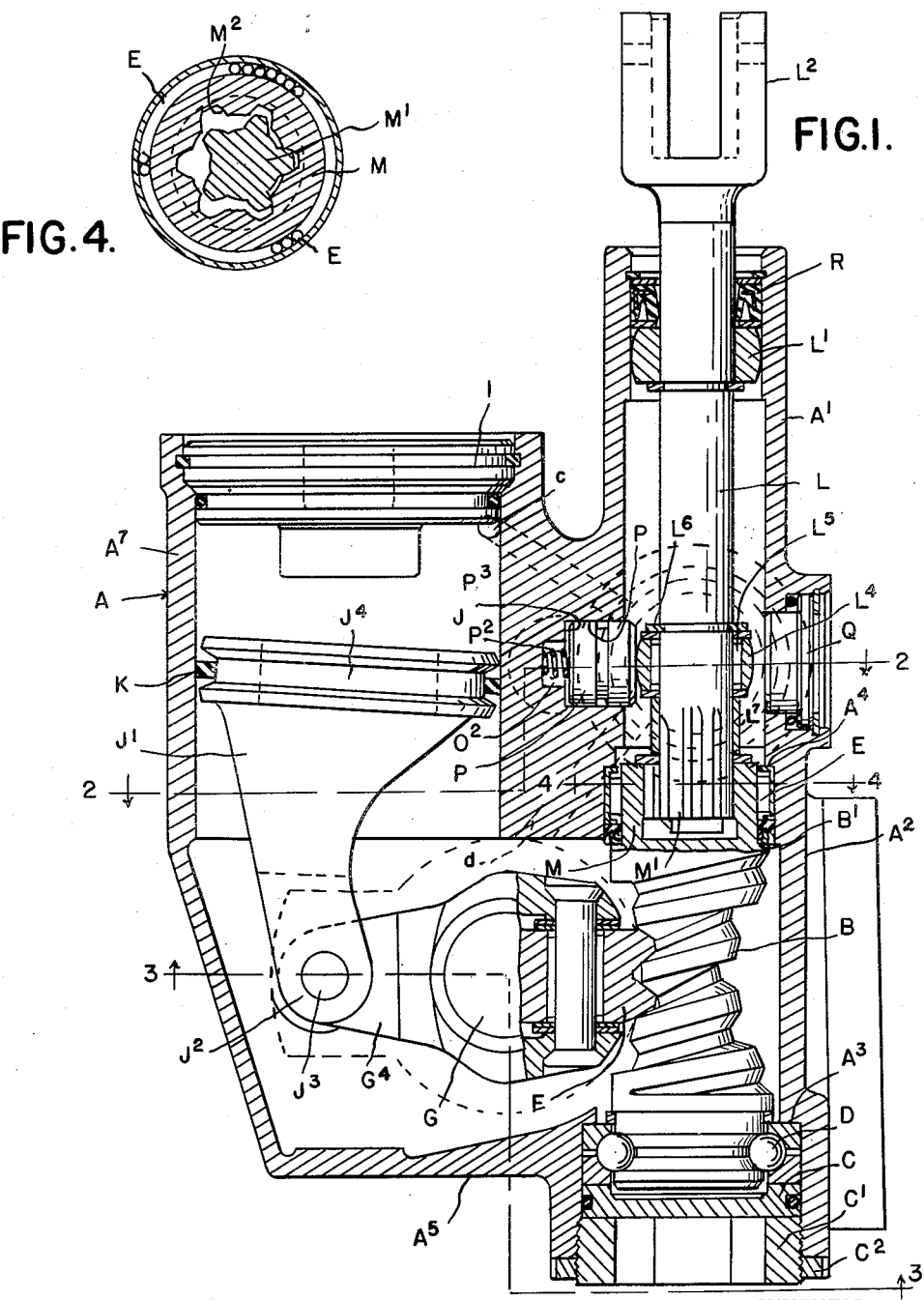
INVENTOR.
CHARLES F. HAMMOND
BY
*Whittemore Hulbert & Belknap*
ATTORNEYS Nov. 29, 1955  C. F. HAMMOND  2,724,977
MANUAL AND POWER ACTUATED STEERING MECHANISM
Filed July 2, 1954  3 Sheets-Sheet 2
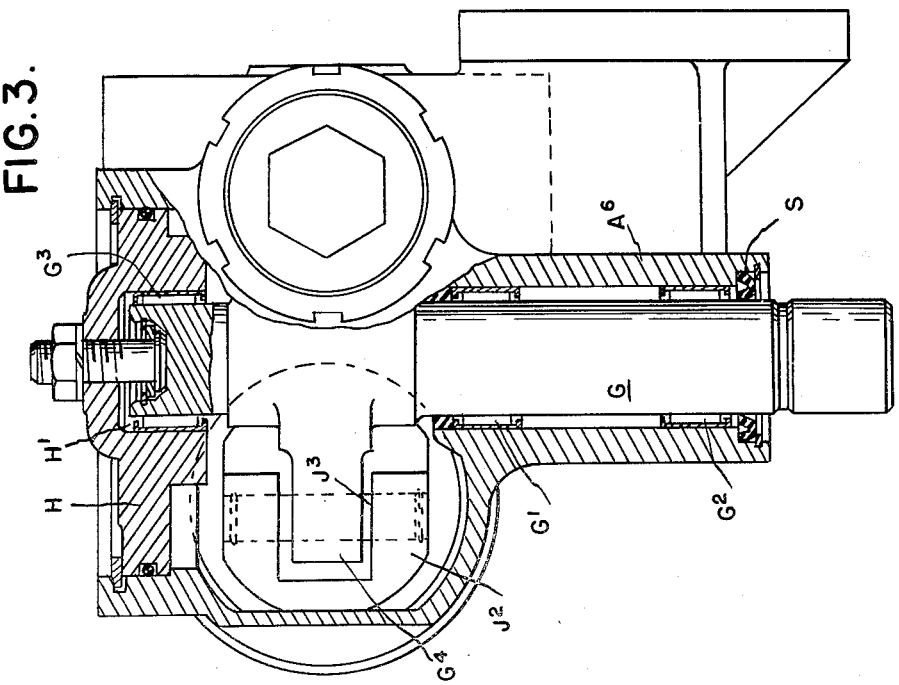
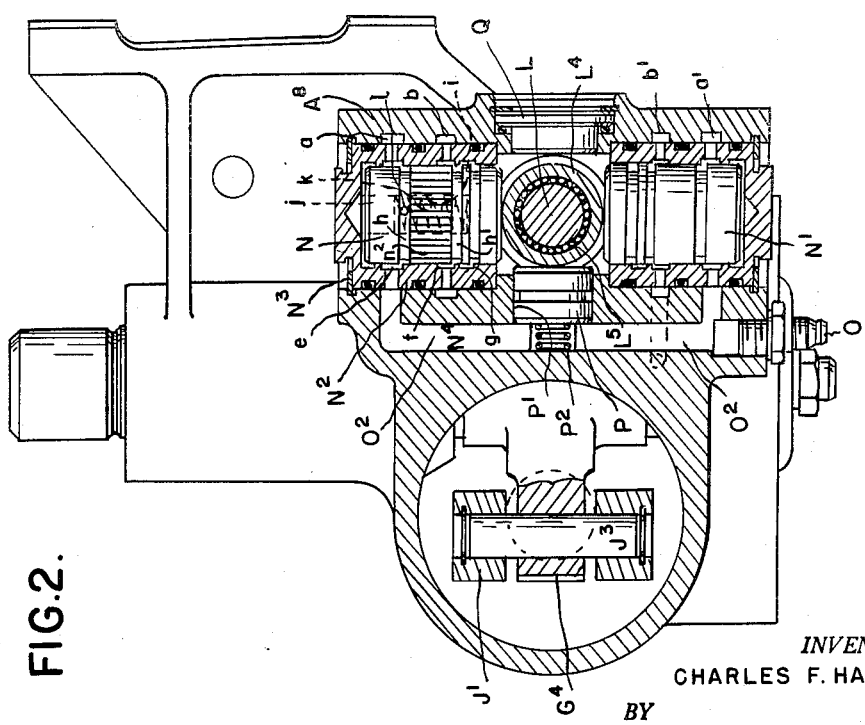
INVENTOR.
CHARLES F. HAMMOND
BY
*Whittemore Hulbert & Belknap*
ATTORNEYS

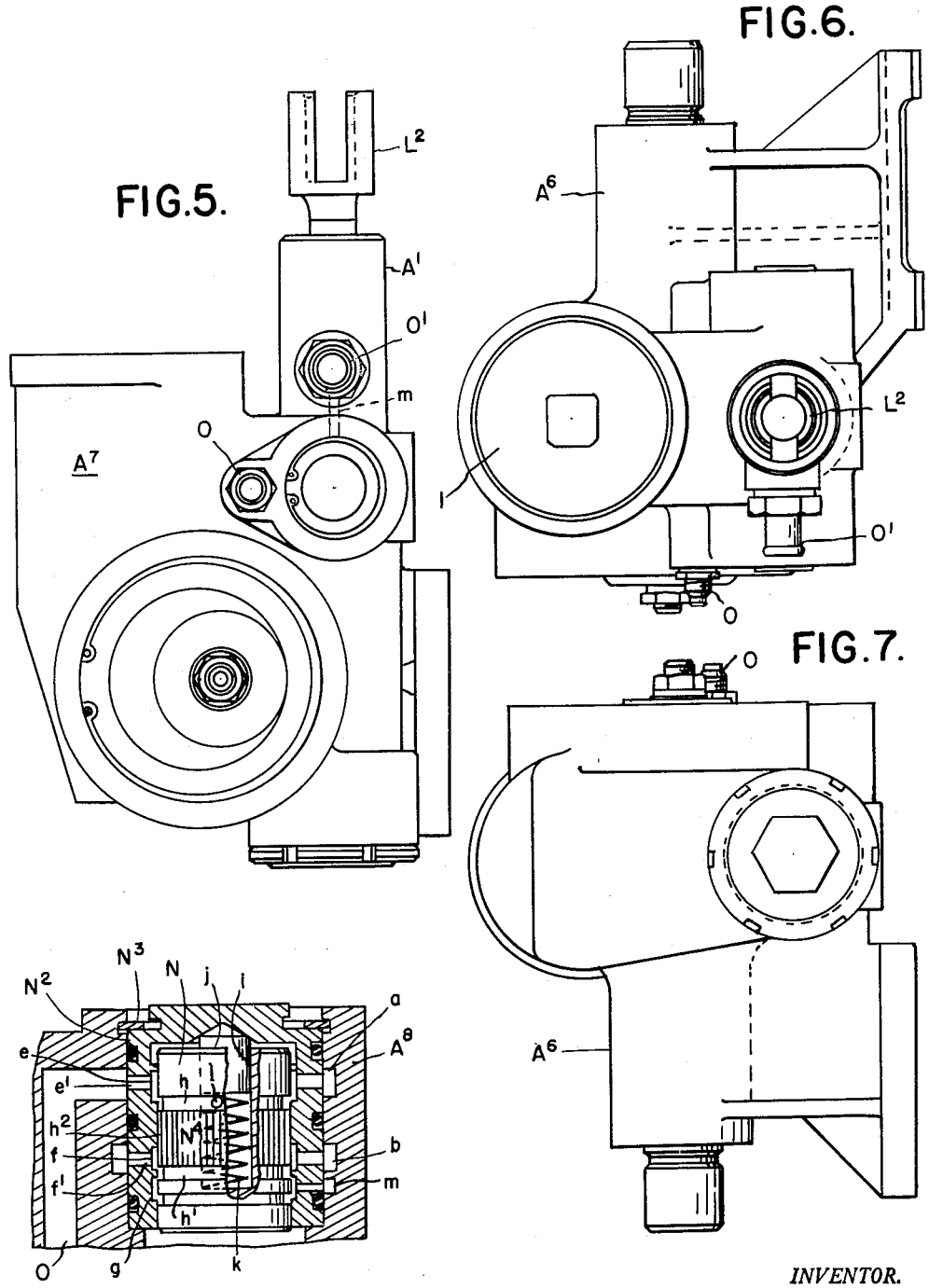

United States Patent Office 2,724,977
Patented Nov. 29, 1955

2,724,977

MANUAL AND POWER ACTUATED STEERING MECHANISM

Charles F. Hammond, Grosse Pointe, Mich., assignor to Gemmer Manufacturing Company, Detroit, Mich., a corporation of Michigan Application July 2, 1954, Serial No. 440,956

10 Claims. (Cl. 74—388)

The invention relates to manual and power actuated steering mechanism for motor vehicles and forms a continuation-in-part of my earlier application for patent, Serial No. 234,795, filed July 2, 1951, now Patent No. 2,707,375.

It is the object of the invention to obtain a construction which can be manufactured at lower cost and which has various advantages over the construction forming the subject matter of my earlier application. With these objects in view the invention consists in the construction as hereinafter set forth.

In the accompanying drawings:

Fig. 1 is a substantially vertical longitudinal section through the unit including the greater portion of the mechanism;

Fig. 2 is a cross-section on line 2—2, Fig. 1;

Fig. 3 is a cross-section on line 3—3, Fig. 1;

Fig. 4 is a cross-section on line 4—4, Fig. 1;

Fig. 5 is an elevation viewed as in Fig. 1;

Fig. 6 is a plan view;

Fig. 7 is a bottom plan view;

Fig. 8 is an enlarged section showing a portion of Fig. 2.

In common with the construction forming the subject matter of my earlier application above referred to, the construction of the instant application comprises a unit mounted on the sprung frame of the vehicle at the base of the steering column which also is mounted thereon. This unit includes the usual force increasing gearing forming a part of the manually operable steering mechanism and which as shown is a worm gearing. In addition there is a hydraulic motor for the power actuation of the mechanism and which itself is operated by a hydraulic power circuit independent of the unit and energized by the motor of the vehicle. The unit also includes a valve means which is actuated by the manually operable mechanism and controls the operation of the motor. In my earlier construction this valve mechanism was operated by a limited planetary displacement of one spur gear about the axis of another spur gear with which it is in mesh, said gears forming the driving connection between a manually operated shaft in the steering column and the shaft of the worm. The displacement was caused by the torque reaction of the worm and therefore was in advance of any rotation of the latter. However, during the operation of the motor, hydraulic pressure proportional to the load operating on said valve means would tend to restore the valve and its manual actuated mechanism to neutral.

My improved construction differs from the above in the following particulars:

In the earlier construction the motor though a part of the unit was separate and sealed from the chamber for the gearing. In the improved construction the chamber containing the gearing is a portion of the motor. This simplifies the construction reducing cost of manufacture. In the earlier construction the axis of the shaft in the steering column was offset from the axis of the work by a dimension equal to that between the centers of the spur gears. In the improved construction this spacing is minimized by substituting internal and external intermeshing gears for the spur gears. Consequently the rotary shaft in the steering column is substantially in alignment with the axis of the worm and the construction is simplified. Other advantageous features will become apparent in the specific construction which is as follows:

A is a housing for the unit preferably an integral casting which contains the worm gearing, motor, valve means and their connections. This housing has an upwardly extending cylindrical portion A' for the mounting of the tubular steering column (not shown). In line with and below the portion A' is a segmental cylindrical portion A² which contains the worm B which is inserted upward therein together with its bearings through an opening in the bottom normally closed by a cap C. The bearings for the worm include a double end thrust ball bearing D insertable through the opening and engaging an annular shoulder A³. At the upper end of the worm is a needle bearing E between a shoulder A⁴ on the housing and a shoulder B' on the worm. The assembled worm and its bearings may be introduced through the bottom opening and then secured by a threaded clamping member C' and lock nut C². Projecting laterally from the portion A² is a portion A⁵ which forms an extension of the chamber for the worm and contains the cooperating worm wheel F mounted on a rock shaft G. These parts are introduced into the housing through a circular opening of sufficient area, at one side of the portion A⁵ and closed by a cap H. On the opposite side of the portion A⁵ is a tubular extension A⁶ for the shaft G and needle bearings therefor G' and G². The cap H has an eccentric recess H' on its inner side which contains a needle bearing G³ for the shaft and is in axial alignment with the tubular extension A⁶.

*Motor construction*

Extending upward from the portion A⁵, parallel to and at one side of the portion A', is a cylinder portion A⁷ which constitutes the cylinder of the motor. This portion is open at its upper end and is closed by a cap I. Within the cylinder is a piston J which has integral therewith a downwardly projecting arm J' terminating in a bifurcated portion J² which embraces a rock arm G⁴ on the rock shaft G and is attached thereto by a pivot J³. With such constructions it is obvious that any movement of the piston axially within the cylinder must cause the pivot J³ to traverse an arcuate course with a consequent rocking of the arm J' and piston J. This would not be possible if the periphery of the piston were of cylindrical form closely fitting the cylinder and I have, therefore, substituted a segmental spherical form for the periphery of the piston. The sealing is effected by a ring K of resilient deformable material which occupies an annular groove J⁴ in said periphery. During movement of the piston this ring K must change from a circular to an elliptical form which is possible by reason of the resiliency of the material with the result that the seal is maintained in all positions of travel.

*Valve means and its operating mechanism*

For receiving the valve means the housing A is provided with a cylindrical portion A⁸ having its axis transverse to the common plane of the cylindrical portions A² and A⁷ and open at its opposite ends. This cylindrical portion A⁸ intersects the cylindrical portion A' without obstructing the latter or the passage therethrough of the shaft for rotating the worm. As previously stated the axis of this shaft L is slightly offset from the axis of the worm which permits of coupling these members by internal and external gears. Preferably the internal gear M is formed in the wall of a recess B² in the upper end of the worm B and which is surrounded by the needle bearing E. The external gear M' is formed on the lower end portion of the shaft L and is of a lesser number of teeth so as to mesh with the gear M on one side only. As specifically shown, the gear M has six teeth and the gear M' only five, which reduces its diameter sufficiently to avoid interference. As the shaft L is used to operate the valve means it must be free for a limited displacement of the gear portion M' planetarily with respect to the gear M. This is provided for by a segmental spherical collar L' on the shaft L engaging the wall of the cylindrical portion A' to form a universal pivot. The portion of the shaft L above this collar L' extends outward from the portion A' of the housing and has at its upper end a bifurcated portion L² for coupling with the manually operated steering stem (not shown) which is attached to the hand wheel and passes downward through the steering column. There is also a resilient bushing L³ within this bifurcated portion which permits of the rocking of the shaft L and which also forms a sound deadening connection between said shaft and the actuating stem.

Specific valve means

The specific construction of the valve means may be varied but as illustrated it comprises a pair of piston valves N, N' located within the cylindrical portion A⁸ on opposite sides of the shaft L. Each of the valves N, N' has a cylindrical casing member N² closed at its outer end and which fits within the portion A⁸ and is secured therein by a snap ring N³. Slidable within the casing N² is a piston N⁴ which at its inner end contacts with a non-revoluble collar L⁴ on the shaft L. This collar has a needle bearing L⁵ between the same and the shaft and is held against axial displacement by a snap ring L⁶. A flange collar L⁷ is sleeved on the shaft L between the collar L⁴ with its needle bearing L⁵ and the internal gear M. Thus if the shaft L is planetarily displaced by torque reaction of the gear wheel M in either direction in accordance to the direction of rotation of said shaft the collar L⁴ will apply end pressure to one or the other of the pistons N⁴ of the valves N and N'. Each of these valves controls a fluid inlet and a fluid outlet passage, which passages are formed partly by channels in the pistons and casing members and also in channels and cored passages in the housing A which are arranged as follows: Nipples O and O' secured to the housing A are connected respectively to the inlet and return conduits (not shown) of the hydraulic power circuit. The nipple O communicates with a cored passage O² which extends to each of the valves N, N' and communicates with annular channels a and a' in the inner surface of the cylindrical portion A⁸. Other annular channnels b and b' in the inner face of the portion A⁸ communicates respectively through passages c and d with the outer end of the cylinder A⁷ and the chamber within the portion A⁵. The valves N and N' are the same in construction and similar to those in my former patent above referred to. Each has its casing member N² provided with spaced annular channels e, f, and g and its piston member N⁴ has spaced channels h, h' which are connected by longitudinal grooves h² to be in effect a single channel. The piston has a central cylindrical recess i open at its outer end within which is a piston member j bearing against the closed end of the member N². A light spring k is between the member j and the closed end of the piston N⁴ and a radial port l connects the channel h with the chamber i. The channels e and f are connected by radial ports e' and f' with channels a and b. There is also a passage m connecting the channels g with the outlet nipple O'. As shown the channels e and f in the member N² overlap the channels h and h' in the piston N⁴ and the channel h' overlaps the channel g. The channel h' communicates with the space between the valves through longitudinal grooves h².

With the construction as thus far described, when the manually operable steering wheel (not shown) is in neutral position the shaft L will also be in neutral position, as shown in Figs. 2 and 4. The pistons N⁴ will, therefore, be positioned to permit a restricted flow of fluid from the inlet O to the outlet O' and equal fluid pressures will be communicated to the outer end of the cylinder A⁷ and the casing within the chamber portion A⁵. If then the shaft L is rotated by the manually operated means, torque reaction of the gear M will cause the gear wheel M' to move planetarily in one direction or the other according to the direction of rotation of the manual means. This will cause outward movement of one of the pistons N⁴ against hydraulic pressure acting on the outer end thereof and will simultaneously permit hydraulic pressure against the end of the other piston to move it inward following and in contact with the collar L⁴. The result will be that pressure fluid will operate on one side of the piston J and will be relieved from its opposite side so that said piston will travel in a corresponding direction and will operate the rock shaft G.

It is necessary to hold the gear wheels M and M' in mesh while under torque stresses and at the same time to permit the shaft L to move as required to operate the valves. For this purpose I have provided a yieldable bearing P contacting the collar L⁴ on the side thereof opposite to that of the intermeshing teeth of the gears M and M'. The yieldable pressure on this bearing is hydraulic and as shown the bearing P is a piston engaging a small cylinder P' within the portion A⁸ and with its axis extending radially in relation to that of the shaft L while in its neutral position. The outer end of the cylinder P' communicates with the passage O² so that the piston P is under fluid pressure and there is also a spring P² for pressing the piston against the collar L⁴ when fluid pressure is not acting. A shoulder P³ limits the opposite movement of the piston. To permit of installing the piston P in the cylinder P' there is an opening in the portion A' of the housing opposite the same which is normally closed by a cap Q.

Sealing means

The removable closures C, H, I and Q are sealed by peripheral resilient rings and are held in position by their snap rings or other securing means, thereby preventing any fluid leakage. The only other points of possible fluid escape are between the outer portion of the shaft L and the cylindrical portion A' of the housing and between the outer end portion of the rock shaft G and the surrounding housing portion A⁶. These are closed respectively by sealing means R and S. All other chambers and passages are within the integral housing A and therefore provide no escape for the fluid. In addition to the function of transmitting fluid the chambers within the housing contain the lubricating means for all of the mechanism.

What I claim as my invention is:

1. In a manually and power actuated steering mechanism, a housing forming the base of the steering column having a chamber therein with portions thereof extending at right angles to each other, one constituting a cylinder, a worm in the other portion of said chamber having its axis parallel to the axis of said cylinder and in alignment with said steering column, a pistion in said cylnder, a rock shaft extending into said chamber between said worm and cylinder, a worm gear on said rock shaft in mesh with said worm, a rock arm on said rock shaft, and an arm extending axially from said piston, said arms being pivotally connected with each other whereby movement of said piston in said cylinder will be translated into rotation of said worm, a manually operable shaft in slightly offset alignment with the axis of said worm, internal and external intermeshing gears forming a torque transmission means between said shaft and said worm and located at the angle of said housing between said portions of the chambers therein, one of said gears having freedom for a limited planetary movement with respect to the other in response to torque load reaction, hydraulic connections to the portions of said chamber on opposite sides of said piston, and valve means controlling said connections operated by said planetary movement to apply power to rotate said worm in the direction of and in proportion to the manual operation of said shaft.

2. The construction as in claim 1 in which said piston has peripheral sealing means with said cylinder permitting rocking movement therein during axial travel.

3. The construction as in claim 1 in which said piston has a segmental spherical peripheral surface with an annular groove therein and a resilient deformable sealing ring in said groove.

4. The construction as in claim 1 in which said valve means is in a portion of said housing between said cylinder portion and chamber having relatively short fluid passages therebetween.

5. The construction as in claim 1 in which said manually operable mechanism has two substantially aligned rotary members with their axes slightly offset and an internal, external gear coupling therebetween permitting a limited planetary displacement of one with respect to the other in response to torque reaction, said valve means being actuated by such displacement.

6. The construction as in claim 5 in which said gear coupling is located between a manually rotatable shaft and the worm member of said worm gearing, said shaft being the planetarily displaced member.

7. The construction as in claim 6 in which said internal gear is mounted at the end of said worm member and the external gear is at the end of said shaft and within said internal gear.

8. The construction as in claim 7 in which said shaft has a non-revoluble collar thereon, said valve means including a pair of piston valve members on opposite sides of said collar and actuated thereby in the general direction of planetary displacement, and a resiliently yieldable bearing for said collar in a direction transverse to said general direction.

9. The construction as in claim 8 in which said yieldable bearing is under fluid pressure equal to that energizing said motor.

10. The construction as in claim 8 in which said housing has aligned cylindrical chambers therein respectively for said worm and its actuating shaft, a lateral extension of the worm chamber for the cooperating gear and rock shaft, said cylinder portion being parallel and adjacent to said shaft chamber.

References Cited in the file of this patent
UNITED STATES PATENTS

| | | |
|---|---|---|
| 2,065,513 | Centervall | Dec. 29, 1936 |
| 2,622,827 | Hayman et al. | Dec. 23, 1952 |